Dec. 10, 1940.    G. ALGARSSON    2,224,177
SYNCHRONIZING MECHANISM FOR AIRCRAFT ENGINES
Filed Nov. 6, 1937    3 Sheets-Sheet 1

STARBOARD ENGINE FASTER THAN PORT ENGINE

MEMBER 20 LAGGING
VALVE CLOSED

MEMBER 20 DRIVING
VALVE OPEN

INVENTOR
GRETTIR ALGARSSON
BY
ATTORNEY

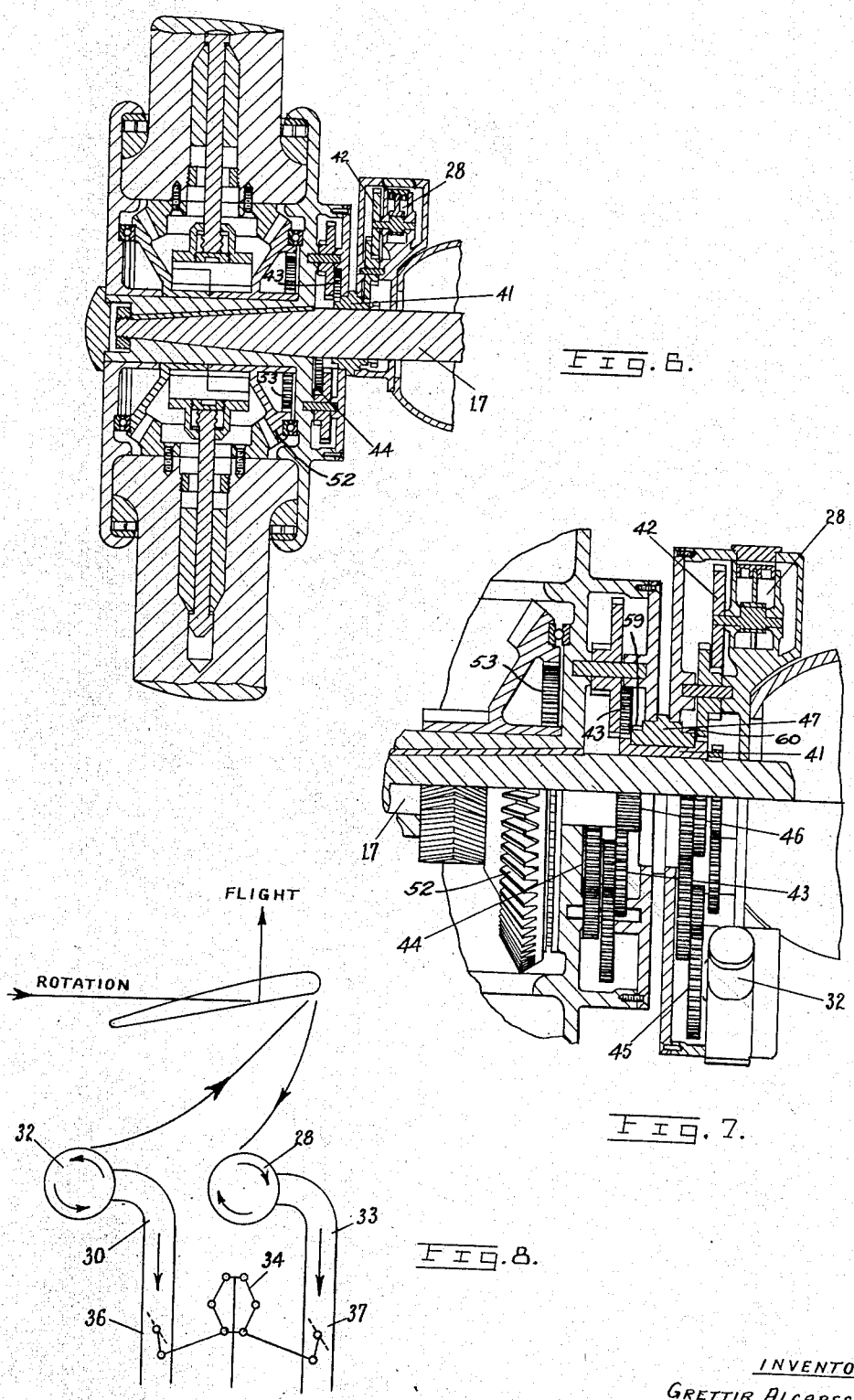

Dec. 10, 1940.                G. ALGARSSON                2,224,177
              SYNCHRONIZING MECHANISM FOR AIRCRAFT ENGINES
                Filed Nov. 6, 1937          3 Sheets-Sheet 3

INVENTOR
GRETTIR ALGARSSON
ATTORNEY

Patented Dec. 10, 1940

2,224,177

UNITED STATES PATENT OFFICE 2,224,177

SYNCHRONIZING MECHANISM FOR AIRCRAFT ENGINES

Grettir Algarsson, Montreal, Quebec, Canada

Application November 6, 1937, Serial No. 173,096

5 Claims. (Cl. 170—135.6)

This invention relates to synchronizing mechanism for aircraft engines, as described in the present specification and illustrated in the drawings forming a part of the same.

The invention consists essentially in utilizing the lag in speed of any prime mover behind that of the fastest in the series, to effect synchronization, as pointed out in the claims for novelty following a description in detail of one form of the invention.

One of the objects of this invention is to provide means whereby exact synchronization is achieved automatically under all conditions of operation thus eliminating the need for adjustment or supervision.

A further object is to provide a means of obtaining positive synchronization through direct gearing, without the use of governors or other spring operated devices.

A further object is to provide means whereby the engines of aircraft provided with controllable pitch airscrews may be synchronized whether they are fitted with governors or not.

In order to more clearly point out the novel features of the invention, reference is made to the accompanying drawings in which, Figure 1 is a diagrammatic showing of the various operating parts and their connections as related to twin engined aircraft provided with variable pitch airscrews controlled by pumps, and showing a governor adapted for constant speed regulation.

Figure 6 is a vertical fore and aft section of the hub of a variable pitch airscrew, showing one pump adapted to effect a decrease of pitch setting of the airscrew blades.

Figure 7 illustrates an arrangement in which two pumps are used, one to effect decrease and the other to effect increase of the pitch setting of the airscrew blades.

Figure 8 is a diagram showing a typical blade section and the various forces acting upon it, including the reactive forces of the two pumps illustrated in Figures 1 and 7.

Figure 1:
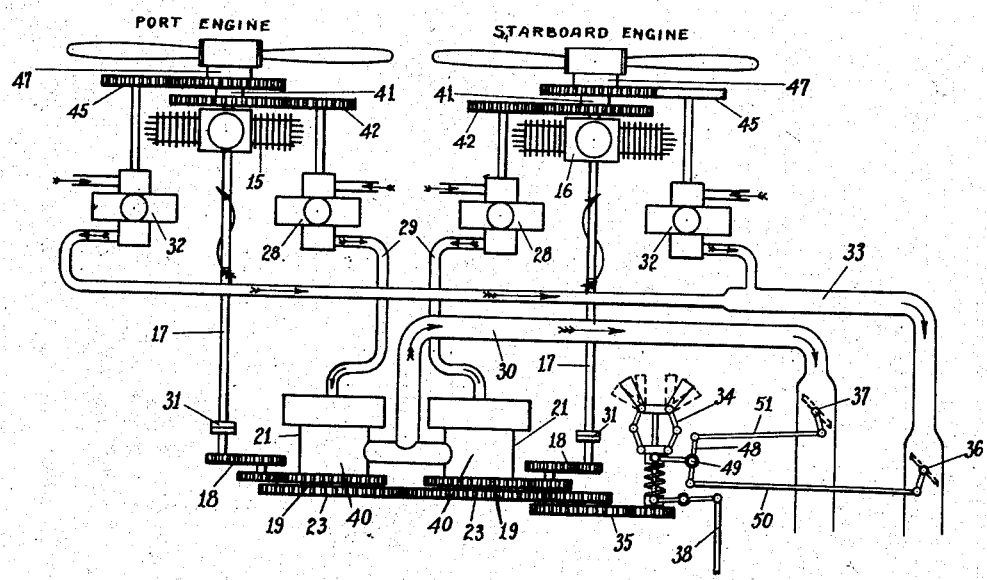

Referring to the drawings, two engines are shown and described, the port engine being numbered 15 and rotating in an anti-clockwise direction looking forward, i. e. having left hand rotation. The starboard engine is numbered 16 and rotates in a clockwise direction looking forward, i. e. having right hand rotation.

Each engine has a driven shaft 17 extending rearwardly to connect with two similar trains of gears 18 whose final gears 19 form an integral part of the lag members 20. These lag members 20 together with the synchronizing members 22 form the control valves mounted within the common valve casing 21. Each lag member is shown as a sleeve rotatable about and journalled on the synchronizing member 22. Each synchronizing member 22 extends outwardly beyond the gear 19 of the lag member 20 and carries a gear 23. The gears 23 mesh together for rotation in opposite directions.

The lag members 20, the synchronizing members 22 and the valve casing 21 together form the complete valves 40.

Following the rotation of each engine, the port engine, having left hand rotation, will cause its lag member 20 to rotate in a left hand direction, while the starboard engine, rotating in a right hand direction, will cause its lag member 20 to rotate in a right hand direction.

Figure 2:
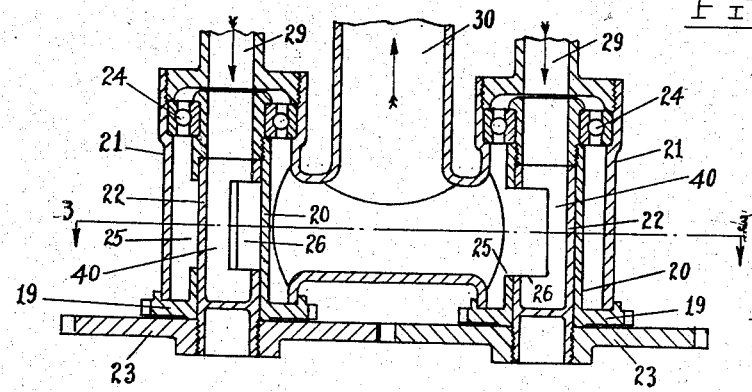
Figure 2 is a horizontal cross-section of the pair of gear driven valves shown in Figure 1.
Figure 3:
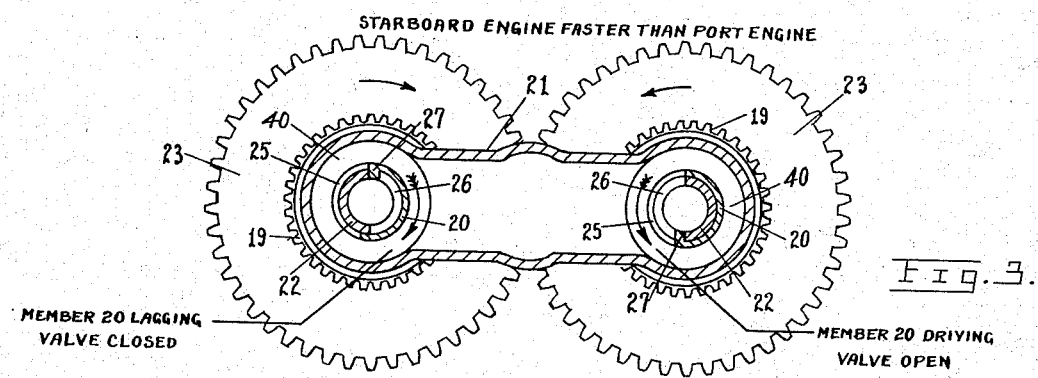
Figure 3 is a vertical cross section on the line 3—3 of Figure 2, showing the port engine valve closed and the starboard engine valve open.
Figure 4:
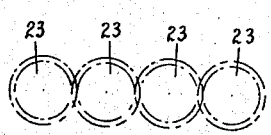
Figure 4 is a diagram showing the relation of the valve synchronizing gears for a four engined installation.
Figure 5:
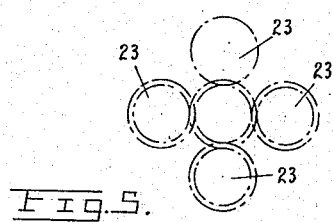
Figure 5 is a diagram showing an alternative relation of the valve synchronizing gears for a four engined installation.

The synchronizing members 22 of the valves 40 are mounted within the valve casing 21 on ball bearing races 24, and are provided with ports 26 which correspond with the ports 25 in the lag members 20. The lag members adjacent ports 25 are provided with inwardly projecting stops 27 which when in contact with one lip of the port 26 transmit the drive from the members 20 to the members 22, thus setting the ports in the open position. This is the position of the starboard engine valve, illustrated in Figures 2 and 3. When one member 20, due to lag of its engine, lags behind its member 22, the stop 27 separates from the lip of the port 26, thus closing the valve until finally the stop 27 makes contact with the opposite lip of the port 26, the valve then being in the closed position. This is the position of the port engine valve, illustrated in Figures 2 and 3, when the starboard engine is the faster engine.

In order to clearly bring out the operation of the invention, a form of variable pitch airscrew is illustrated in Figures 6 and 7. In this form of airscrew, torque reaction of air pumps is used to effect a change of pitch setting, the loads on the pumps and, consequently, their torque reactions being controlled by the setting of the valves 40. This form of airscrew is the subject of my co-pending application Serial No. 174,514, filed on November 15, 1937.

In the form of pitch control mechanism illustrated in Figure 6, the pump 28 is of the reciprocating variety and is driven through the gear train 42 and the gear sleeve 41, journalled on the engine shaft 17, by the rotation of the airscrew.

When the discharge of the pump 28 is throttled a torque reaction is applied through the gear train 42 to the gear sleeve 41, causing the latter to rotate with respect to the shaft 17, thus lagging behind the rotation of the airscrew. This relative rotation of the sleeve 41 with regard to the airscrew, is converted through the gear train 44 into an increase in pitch of the blades.

When the discharge of the pump 28 is unrestricted, there is no torque reaction tending to increase the pitch of the blades, and the inherent centrifugal twisting moments of the latter turns them to low pitch, causing the gear sleeve 41 to overrun the shaft 17.

Figure 9:
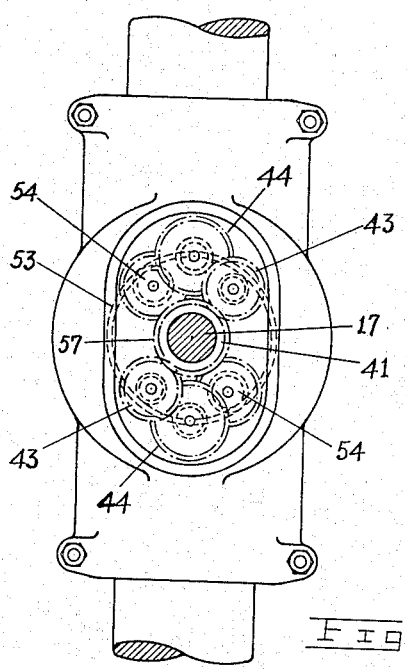
Figure 9 is an elevation of the airscrew hub shown in Figure 6, looking from the rear and showing the arrangement and engagement of the gear trains within the hub casing.
Figure 10:
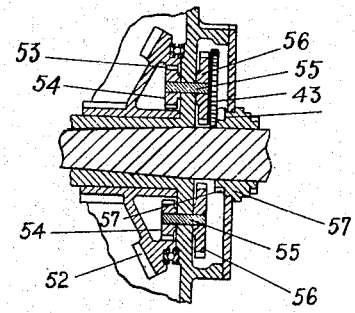
Figure 10 is a partially sectional view showing the connection between the bevel gears and the gear train in the rear of the hub casing.
Figure 11:
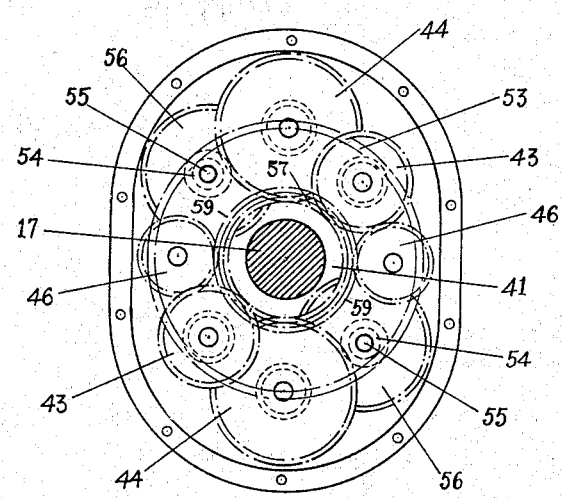
Figure 11 is an elevation of the airscrew hub shown in Figure 7, looking from the rear and showing the arrangement and engagement of the gears within the hub casing.

Figure 6 illustrates a simplified form of the type of pitch control mechanism shown in Figure 1. Figure 9 should be read in conjunction with Figure 6 when examining the following arrangement of gears.

In the back of the bevel gear 52 there is formed an annular ring gear 53. A spur gear 54 is mounted on one end of the shaft 55 and meshes with the annular ring gear 53, while the gear 56 is mounted on the other end of the shaft 55. The final member 43 of the gear trains mesh with the gear 57 on the forward end of the sleeve 41. The gear train 42 has its first member meshing with the gear 58 on the aft end of the sleeve 41.

Figure 7 illustrates the full arrangement of pumps and gearing referred to in Figure 1 and should be read in conjunction with Figure 6.

In the form illustrated in Figure 7 two pumps are shown, each being connected with the gearing within the hub casing in such a manner as to effect a change of pitch setting. The pumps 28 and 32 are mounted on the engine casing and have direct mechanical connection with the gearing within the hub casing. When the valve 37 is moved towards its closed position, the pumps 28, which discharge through conduit 30, have an increased load on them and, by reducing the speed of the gear 42, decrease the pitch of the blades. The gear sleeve 41 journalled on the engine shaft 17 is the connecting member between the gearing 42 of the pump 28 and the gear 43 which is the second member of the gear train 44, within the hub casing, acting to cause change of pitch of the airscrew blades.

When the valve 36 is moved toward its closed position and the valve 37 towards the open position, the pumps 32, which discharge through the conduit 33, have an increased load on them and, by reducing the speed of the sleeve 47 and acting through the reverse gear wheels 46 increase the pitch of the blades. The valves 36 and 37 are so arranged that as one closes the other opens, thus protecting the device against conflicting operation of the two sets of pumps. The connection between its gearing 45 and the gear 46, which is the first member of the gear train 44, is through the sleeve 47 journalled on the sleeve 41.

The sleeve 47 is provided with fore and aft gears 59 and 60.

The reverse gear wheels 46 engage with the last members 43 of the trains of gears between the bevel gears and the sleeve 47. These gears have extended width in order to engage with the gear 59 on the sleeve 47 thereby giving reverse rotation to the bevel gears on the application of reactive torque from the pump 32.

The trains of gears 42 and 45 from the air pumps 28 and 32 are similar to each other, but are taken off, one from each of the sleeves 41 and 47.

The pump 28 acting on each airscrew is provided with a discharge line 29 (see Fig. 1) leading to the centre of its corresponding valve 40 while a common connection 30 leads away from both valves.

Referring to Figure 1 in the drawings. When the speed of one engine lags behind that of the other, the member 20 of the corresponding valve 40 lags toward the closed position behind the synchronizing member 22 of that valve, as shown in detail on the left hand side of Figure 3. When the valve is partially closed due to lag of the member 20, a load is put on the pump 28 causing it to drag the airscrew blades into a lower pitch setting, thereby lessening the load upon the engine and permitting an increase in speed. This increase of speed in the lagging engine will continue until either synchronization is established between the two engines or the valve of the lagging engine is completely closed. If synchronization is established the valve will cease to move, owing to the fact that no further lag occurs. If on the other hand synchronization is not established when the valve is completely closed, means 31 are provided in the drive shafts 17 whereby the shafts may continue to lag without damage to the valves and their gears. This means 31 may take the form of a free wheel, ratchet or similar device.

The pumps 32 are adapted to effect an increase in pitch setting of the airscrews. Pipe lines lead from the discharge side of each pump 32 to a common line 33 in which is provided the valve 36. A similar valve 37 is provided in the common connection 30 leading from the valves 40.

A governor 34 is driven by means of a train of gears 35 from the synchronizing gears 23. The governor therefore is run in agreement with the speed of the faster engine and is connected with both the valves 36 and 37. The connection between the governor 34 and the valves takes the form of a T member 48 pivoted at 49. Tie rods 50 and 51 extend from the T member 48 to the valves 36 and 37 respectively.

The governor 34 is of the centrifugal type employing weights which tend to move outwards under the action of centrifugal force, rotating the T member 48 about the pivot 49. This tendency is opposed by a spring which is adjusted by the control 38.

On increase of engine speed the governor 34 closes the valve 36, thereby putting a load on the pumps 32 causing them to drag the airscrew blades into higher pitch settings, increasing the load upon the engines and causing a decrease of speed. Simultaneously, the governor opens the valve 37 relieving any pitch reducing load on the pumps 28.

On decrease of engine speed, the governor 34 closes the valve 37, thereby putting a load on the pumps 28 causing them to drag the airscrew blades into lower pitch settings, relieving the loads on the engines and permitting an increase in speed. Simultaneously, the governor opens the valve 36 thereby relieving any pitch increasing load on the pumps 32.

Closing of the valve 37 will increase the loads on the pitch reducing pumps 28 regardless of the setting of the synchronizing valves 40 and consequently the action of the governor in response to increased speed of the faster engine will result in reduced pitch in both airscrews.

The governor 34 is provided with a manual control 38 whereby the setting of the governor may be varied to obtain any desired constant engine speed.

While a particular form of rotary valve has been illustrated and described, any suitable form of valve could be adapted to the purpose of this invention, or the rotary valve could be replaced by one of the stationary type whose control could be operated by direct reciprocation set up by the lag between gears arranged as in the rotary valve already described.

With this invention, it will be seen that positive synchronization of the engines is automatically and rapidly achieved under all conditions of flight without imposing any burden upon the pilot or operator and with a negligible expenditure of power and weight.

The pumps illustrated and described may be pneumatic or hydraulic, and the valves may be located on the intake or discharge side, depending on the pitch control mechanism employed.

In the event of electrically controlled variable pitch airscrews being used, the valves would be replaced by rheostats or other similar devices and the pumps themselves could be replaced by electric generators.

What I claim is:

1. In an aircraft having two or more engines, each engine being equipped with an airscrew, means for varying the pitch of each airscrew, comprising planetary gears driven from the airscrew hub and a fluid pump driven by the gears which decreases the pitch on increasing the load and a second fluid pump which increases the pitch on increasing its load, a governor-operated valve for regulating the speed of the engines through said pump for increasing the pitch, a synchronizing device for the engines comprising a ported valve member for each engine, a gear for each engine fixed thereto, positively driven by the engine, a second ported valve member for each engine and a synchronizing gear fixed thereto, each synchronizing gear being a member of a common gear train, and a limiting mechanism causing the first valve member to drive the second, with their ports in registry, when said engine is the fastest but allowing the first valve member to lag behind the second, with the ports closed when the latter is driven by another engine through its synchronizing gear.

2. In an aircraft having two or more engines, each engine being equipped with an airscrew, means for varying the pitch of each airscrew, comprising planetary gears driven from the airscrew hub and a fluid pump driven by the gears which decreases the pitch on increasing the load and a second fluid pump which increases the pitch on increasing its load, a governor-operated valve for regulating the speed of the engines through said pump for increasing the pitch, a synchronizing device for the engines comprising a ported valve member for each engine, a gear for each engine fixed thereto, positively driven by the engine, a second ported valve member for each engine and a synchronizing gear fixed thereto, each synchronizing gear being a member of a common gear train, a limiting mechanism causing the first valve member to drive the second, with their ports in registry, when said engine is the fastest but allowing the first valve member to lag behind the second, with the ports closed, when the latter is driven by another engine through its synchronizing gear, and a disengaging device permitting the first valve member to continue to lag behind the second after relative movement between the valve members has taken place to a predetermined extent.

3. In an aircraft having two or more engines, each engine being equipped with an airscrew, means for varying the pitch of each airscrew, comprising planetary gears driven from the airscrew hub, and a fluid pump driven by the gears which decreases the pitch on increasing the load and a second fluid pump which increases the pitch on increasing its load, a governor-operated valve for regulating the speed of the engines through said pump for increasing the pitch, a synchronizing device for the engines comprising a ported valve member for each engine, a gear for each engine fixed thereto, positively driven by the engine, a second ported valve member for each engine, a transmission positively connecting all said second ported valve members, a limiting mechanism causing the first valve member to drive the second, with their ports in registry, when said engine is the fastest but allowing the first valve member to lag behind the second, with the ports closed, when the latter is driven by another engine through the transmission, and a disengaging device permitting the first valve member to continue to lag behind the second after relative movement between the valve members has taken place to a predetermined extent.

4. A synchronizing device for multi-engined installations comprising a rotatable ported valve member for each engine, a gear for each engine fixed thereto, a second rotatable ported valve member for each engine journalled on the first valve member, and a synchronizing gear fixed thereto, each synchronizing gear being a member of a common gear train, a lip on one of said valve members limiting their relative rotation in one direction when the ports are in registry and in the other direction when the ports are closed, and a free wheel device for each of said first valve members permitting continued rotation after the ports are closed.

5. A synchronizing device for multi-engined installations, comprising a rotatable ported valve member for each engine, a gear for each engine fixed thereto, a second rotatable ported valve member for each engine journalled on the first valve member, a transmission positively connecting all said second ported valve members, a lip on one of said members limiting their relative rotation in one direction when the ports are in registry and in the other direction when the ports are closed, and a free wheel device for each of said first valve members permitting continued rotation after the ports are closed.

GRETTIR ALGARSSON.